US009576397B2

(12) United States Patent
Johansson et al.

(10) Patent No.: US 9,576,397 B2
(45) Date of Patent: Feb. 21, 2017

(54) REDUCING LATENCY IN AN AUGMENTED-REALITY DISPLAY

(75) Inventors: Karl-Anders Reinhold Johansson, Staffanstorp (SE); Dan Zacharias Gärdenfors, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 404 days.

(21) Appl. No.: 13/608,879

(22) Filed: Sep. 10, 2012

(65) Prior Publication Data

US 2014/0071116 A1    Mar. 13, 2014

(51) Int. Cl.
*G06T 15/00* (2011.01)
*G06T 19/00* (2011.01)

(52) U.S. Cl.
CPC ..... *G06T 19/006* (2013.01); *G09G 2340/0492* (2013.01)

(58) Field of Classification Search
USPC ......................................................... 345/419
See application file for complete search history.

(56) References Cited

U.S. PATENT DOCUMENTS

| 6,317,118 | B1 | 11/2001 | Yoneno |  |
|---|---|---|---|---|
| 6,367,933 | B1* | 4/2002 | Chen et al. | 353/69 |
| 7,352,913 | B2* | 4/2008 | Karuta | G02B 27/0025 348/746 |
| 2001/0051001 | A1* | 12/2001 | Nakamura | G06T 15/20 382/154 |
| 2002/0027548 | A1 | 3/2002 | Yoneno |  |
| 2003/0043303 | A1 | 3/2003 | Karuta et al. |  |
| 2005/0007372 | A1* | 1/2005 | Ecob | G06T 13/80 345/473 |
| 2006/0050087 | A1* | 3/2006 | Tanimura et al. | 345/629 |
| 2010/0066734 | A1* | 3/2010 | Ohta | 345/419 |

(Continued)

FOREIGN PATENT DOCUMENTS

DE    102009002677    10/2010
EP    2490182    8/2012

(Continued)

OTHER PUBLICATIONS

Izadi, Shahram, et al. "KinectFusion: Real-time 3D Reconstruction and Interaction Using a Moving Depth Camera", UIST' 11, Oct. 16-19, 2011, Santa Barbara. CA, USA. 10 pages.

(Continued)

*Primary Examiner* — Barry Drennan
*Assistant Examiner* — Khoa Vu
(74) *Attorney, Agent, or Firm* — Fish & Richardson P.C.

(57) ABSTRACT

Disclosed are methods and systems for generating display pixel data so as to reduce latency when rendering a representation of a graphic on a display, such as for augmented-reality applications. The method comprises: receiving a set of display pixel coordinate-pairs at the graphics processing unit; applying a transform matrix to the set of display pixel coordinate-pairs to obtain a set of graphic pixel coordinate-pairs, the transform matrix calculated using orientation data received from an external reference; retrieving a set of graphic pixel data associated with the set of graphic pixel coordinate-pairs; and, determining a set of display pixel data based on the retrieved set of graphic pixel data.

26 Claims, 9 Drawing Sheets

(56) References Cited

U.S. PATENT DOCUMENTS

| | | | |
|---|---|---|---|
| 2010/0122168 A1 | 5/2010 | Silberstein et al. | |
| 2010/0177163 A1 | 7/2010 | Yang et al. | |
| 2011/0052023 A1* | 3/2011 | Garg et al. | 382/131 |
| 2011/0212717 A1 | 9/2011 | Rhoads et al. | |
| 2012/0081578 A1 | 4/2012 | Côté et al. | |
| 2012/0113228 A1 | 5/2012 | Konno et al. | |
| 2012/0210255 A1* | 8/2012 | Ooi et al. | 715/762 |
| 2012/0256956 A1 | 10/2012 | Kasahara | |
| 2013/0027430 A1 | 1/2013 | Matsuda et al. | |
| 2013/0300740 A1* | 11/2013 | Snyder et al. | 345/420 |

FOREIGN PATENT DOCUMENTS

| | | |
|---|---|---|
| EP | 2508975 | 10/2012 |
| WO | 02101443 | 12/2002 |
| WO | 2009004296 | 1/2009 |
| WO | 2011132373 | 10/2011 |

OTHER PUBLICATIONS

Hartley, Matt, "Google Merges Digital and Physical Worlds with new Image-Based Projects", Jun. 27, 2012, Financial Post section of the National Post (on-line: http://business.financialpost.com/2012/06/27/google-merges-digital-and-physical-worlds-with-new-image-based-projects/). 4 pages.

European Patent Office, "Extended European Search Report," issued in connection with application No. EP 12183772.8, on Mar. 6, 2013 (10 pages).

European Patent Office, "Extended European Search Report," issued in connection with application No. EP 12183772.8, on Mar. 26, 2013 (10 pages). (Replacement of the EESR issued on Mar. 6, 2013, correcting a typographical error in the application number of reference D2 identified on p. 5 of NPL 1 cited herewith.).

\* cited by examiner

REDUCING LATENCY IN AN AUGMENTED-REALITY DISPLAY

TECHNICAL FIELD

The present disclosure relates generally to augmented-reality systems and, more particularly, to generating display pixel data for rendering a representation of a graphic on a display in augmented-reality systems.

BACKGROUND

Augmented-reality systems can be used in connection with certain electronic devices. For example, digital images can be superimposed over an environment shown on a display of an electronic device in order to provide additional information to a viewer. The digital images can be related to the objects in the environment by location or content, for example.

Electronic devices can use sensor data to identify features of the objects in the environment in order to provide an augmented-reality display. Augmented-reality is a process wherein a live view of a physical, real world environment (which may be obtained via the camera, for example) may be augmented by computer generated images.

BRIEF DESCRIPTION OF THE DRAWINGS

Like reference numerals are used in the drawings to denote like elements and features.

DETAILED DESCRIPTION OF EXAMPLE EMBODIMENTS

Figure 1B:
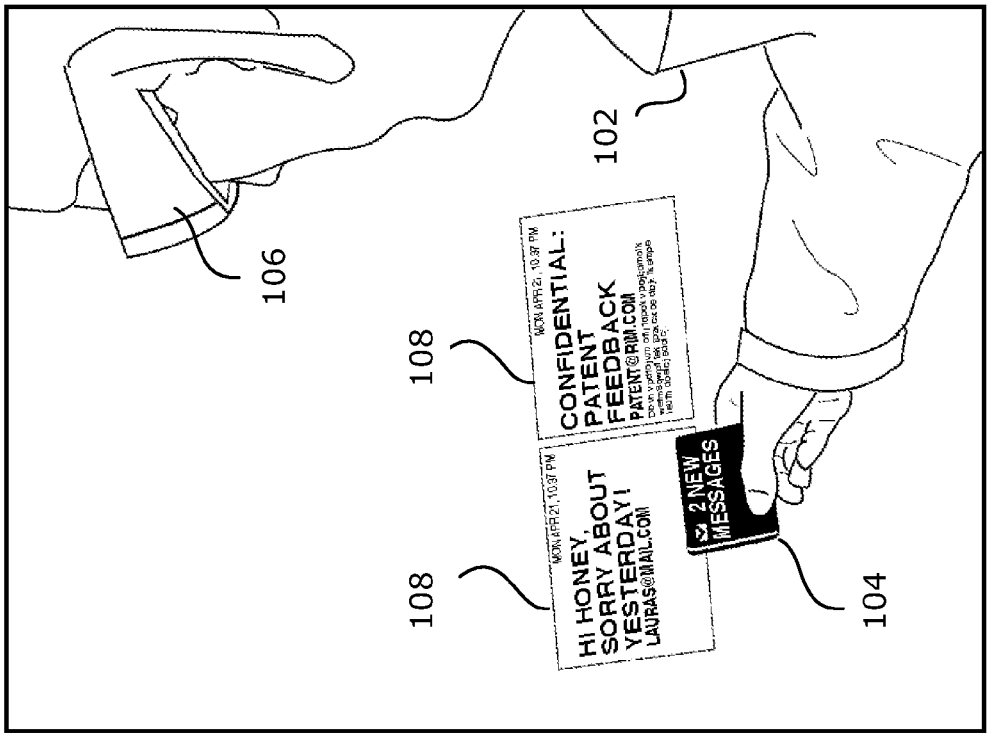
FIG. 1B is a perspective view of a target member and augmented-reality images in an environment.

In one aspect, the present disclosure describes a method, implemented on a graphics processing unit, of generating display pixel data for rendering a representation of a graphic on a display, the method comprising: receiving a set of display pixel coordinate-pairs at the graphics processing unit; applying a transform matrix to the set of display pixel coordinate-pairs to obtain a set of graphic pixel coordinate-pairs, the transform matrix calculated using orientation data received from an external reference; retrieving a set of graphic pixel data associated with the set of graphic pixel coordinate-pairs; and, determining a set of display pixel data based on the retrieved set of graphic pixel data.

In another aspect, the present disclosure describes a graphics processing unit associated with a memory, the graphics processing unit comprising: a controller for calculating a transform matrix based on orientation data received from an external reference, the orientation data representing a three-dimensional plane; a warp unit in communication with the controller for applying the transform matrix to a set of display pixel coordinate-pairs to calculate a set of graphic pixel coordinate-pairs; a pixel-fetch module in communication with the warp unit for retrieving a set of graphic pixel data from a graphic stored in memory, the set of graphic pixel data associated with the set of graphic pixel coordinate-pairs; and, a rendering module for rendering the set of graphic pixel data on the display.

In another aspect, the present disclosure describes a system for generating display pixel data for rendering a representation of a graphic on a display, the system comprising: a memory; a processor for executing instructions stored on the memory; a display; and, a graphics processing unit connected to the memory, display and processor, the graphics processing unit comprising: a control processor for calculating a transform matrix based on orientation data received from an external reference identifying a three-dimensional plane; a warp unit in communication with the control processor for applying the transform matrix to a set of display pixel coordinate-pairs to obtain a set of graphic pixel coordinate-pairs; a pixel-fetch module in communication with the warp unit for retrieving a set of graphic pixel data from an image stored in memory, the set of graphic pixel data associated with the set of graphic pixel coordinate-pairs; and a blending module for determining the set of display pixel data associated with the set of display pixel coordinate-pairs for a rendering on the display.

Other aspects of the present disclosure will be described below.

It can be important to reduce the amount of latency when rendering a representation of a graphic on a display screen in an augmented-reality setting. For example, the augmented-reality system may be a set of wearable glasses with the display screen consisting of one or both of the lenses of the glasses. The graphic to be rendered on the display screen may be associated with the environment or an element of the environment that is visible through the glasses. If the glasses are moved (i.e. the user moves his or her head), the view through the glasses changes and the rendered image (or the rendered graphic) may have to be regenerated or re-rendered on the display screen to reflect this change in view. The time between the changing of the view and the regenerating or re-rendering of the image to reflect this change is a latency that can be beneficial to minimize.

In existing augmented-reality systems, an image or graphic to be rendered on the display is first generated in its entirety by being stored into a frame buffer and then the frame buffer is sent to the display where the image is then rendered. This can cause a noticeable latency in situations when the display is a lens on wearable glasses.

Augmented-Reality Graphic Rendering

Figure 1A:
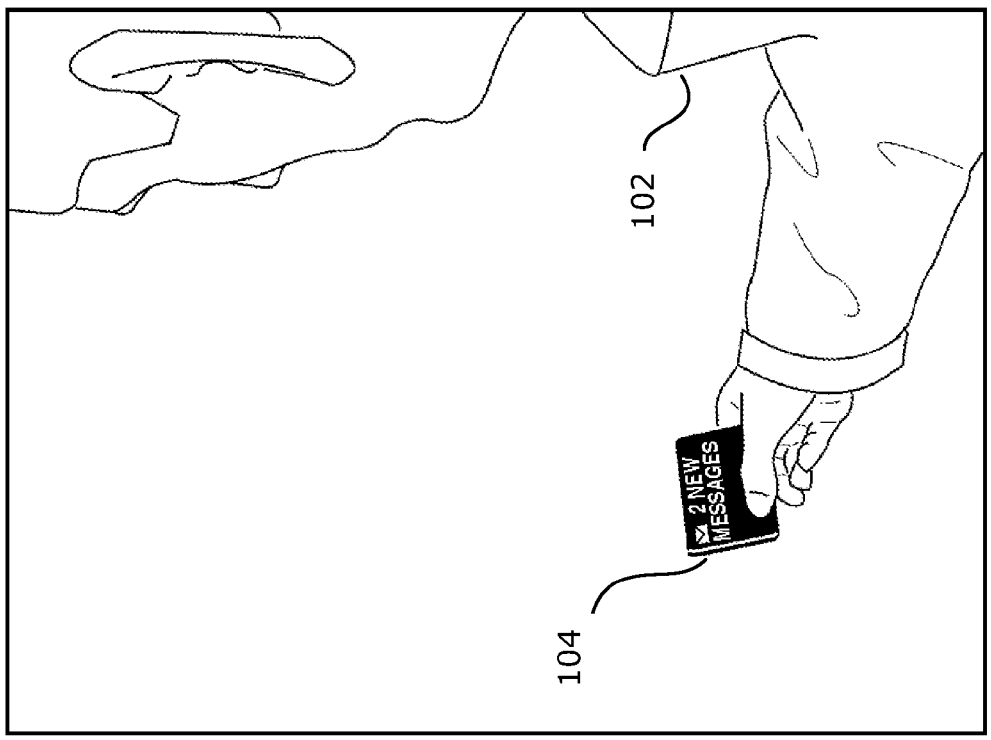
FIG. 1A is a perspective view of a target member in an environment.

FIGS. 1A and 1B show an exemplary embodiment of an augmented-reality system in operation. FIG. 1A shows a person 102 holding a target member 104 without augmented-reality rendered graphics or rendered images. FIG. 1B shows the person 102, the target member 104, an electronic device 106 and rendered images 108. In the embodiment shown, the electronic device 106 is a wearable electronic device, and more specifically a set of glasses. The display on which the rendered images 108 would be rendered (and thus through which the rendered images 108 would be visible) is the lens(es) of the glasses. For illustrative purposes, however, the rendered images 108 are shown in FIG. 1B. The wearable electronic device 106 can be glasses, as shown in the embodiment in FIGS. 1A and 1B. The rendered images 108 can be augmented-reality images and may be digital. The rendered images 108 are displayed or rendered onto a display of the electronic device 106. In the embodiment shown in FIGS. 1A and 1B, the rendered images 108 are rendered onto the lens(es) of the glasses. The lens of the glasses (i.e. the display) can be transparent such that the surrounding environment is visible through the lens. The environment can include objects as seen through the lens of the glasses, such as buildings, trees, roads, etc. (not shown), as well as the target member 104. The augmented-reality rendered images 108, when rendered, are superimposed onto the display over the environment. As such the rendered augmented-reality rendered images 108 can appear to the person 102 as part of the environment (as shown in FIG. 1B). As noted, the rendered images 108 in FIG. 1B would only be visible through the lens(es) of the glasses but are shown in the Figure for illustrative purposes.

The rendered image 108 can be referred to as a rendered graphic. The rendered image 108 can be a picture, text, video or another form digital image. One or more augmented-reality rendered images 108 can be rendered onto the display.

In accordance with one or more embodiments, the target member 104 can identify a location and/or orientation on the display screen of the electronic device 106 onto to which the augmented-reality rendered images 108 can be rendered or projected. In accordance with one or more embodiments, the target member 104 can identify or define a three-dimensional planar region or a three-dimensional plane onto which the one or more graphics can be projected for rendering as rendered images on the lens of the glasses.

The lenses of the glasses are an example of a display onto which one or more graphics can be represented as a rendered image 108. Other examples of displays 106 onto which augmented-reality images can be rendered include display screens of electronic devices such as computers, mobile devices, cellular telephones, smart phones, tablet computers and the like. Accordingly, in one or more embodiments, the display is not transparent or is partially transparent. In situations in which the display is transparent, the environment can be the view through the display and the target member 104 can be an object located in the environment. In situations in which the display is not transparent the electronic device 106, which supports or contains the display, can include a camera or other image sensing component. The camera can capture an image or video to output onto the display. The image or video captured by the camera can be the environment and can include the target member 104 (i.e. the target member 104 can form part of the environment captured on camera or video). The rendered image 108 can be such that it is superimposed over the environment on the display.

In one or more embodiments, the position of the rendered image 108 on the display can be related or associated to the position or orientation of the target member 104 on the display. Further, the orientation of the rendered image 108 on the display can also be related to the position or orientation of the target member 104 on the display. Similarly, the content of the rendered image 108 can be related to the position or orientation of the target member 104. By way of example, the target member 104 may transmit information or data to the electronic device 106 indicating the position or orientation of the target member 104. The electronic device 106 can interpret this information as a three-dimensional planar region onto which the augmented-reality image 108 can be displayed. For example, the target member 104 can include one or more light emitting diodes (LEDs) which can emit light that can be received at the electronic device 106. The electronic device 106 can calculate a three-dimensional plane and/or a three-dimensional planar region based on the infrared light received from the LEDs. By way of further example, the target member 104 can transmit orientation data (determined from a gyroscope, accelerometer, magnetometer, and/or one or more other types of sensors) to the electronic device 106 and the electronic device 106 can use this transmitted orientation data (along with orientation data representing the orientation of the electronic device 106) in order to calculated the relative orientation of the target member 104 and electronic device 106. Using the relative orientation the electronic device 106 and the relative position of the target member 104 (e.g. from one or more LEDs on the target member 104), the electronic device 106 can calculate a three-dimensional plane and/or a three-dimensional planar region. The rendered image 108 can then be positioned or oriented onto the three-dimensional planar region. In one or more embodiments, the target member 104 can transmit data to the electronic device 106 identifying specific graphic (including content, text, photographs or video, for example) to be displayed as a rendered image 108. The rendered image 108 may also be referred to as a representation of a graphic on a display.

Target Member 104

Figure 2:
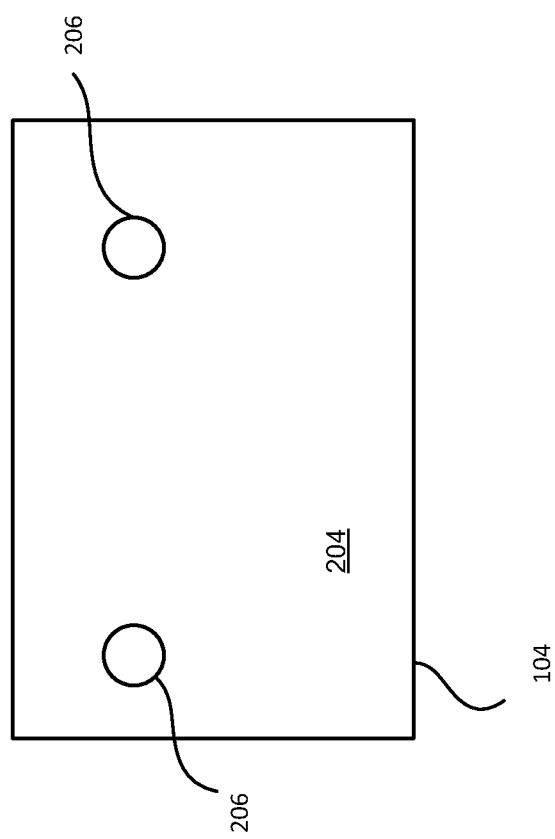
FIG. 2 is a top elevation view of a target member with information emitters.

FIG. 2 shows an exemplary embodiment of the target member 104 in more detail. The target member 104 has a front surface 204 with two LEDs 206. In alternative embodiments there may be more than two LEDs associated with or on the target member 104. For example, there may be four LEDs 206 supported by the target member 104. The two LEDs 206 can both emit light out of the front surface 204 of the target member 104. In one or more embodiments, there can be more than one target member 104, each having at least one data emitting objects (such as the LEDs 206).

The LEDs 206 are examples of data emitting objects or information emitting objects. Other types of data emitting objects can be supported by, associated with or attached to the target member 104.

One or more of the LEDs 206 can emit infrared light. The infrared light emitted from one or more of the LEDs 206 can be received at the electronic device 106. For example, the emitted infrared light can provide information to the electronic device 106 such as the relative location of the LEDs 206.

In one or more embodiments, the target member 104 can itself be an electronic device, such as a computer, smartphone, camera, cellular phone, tablet computer, etc. By way of further example, the target member 104, such as an electronic device, can transmit one or more graphics to be rendered as images in the augmented-reality system on the display of the glasses. Such transmitted graphics can include email messages, calendar reminders, contact information, etc.

Electronic Device 106

Figure 3:
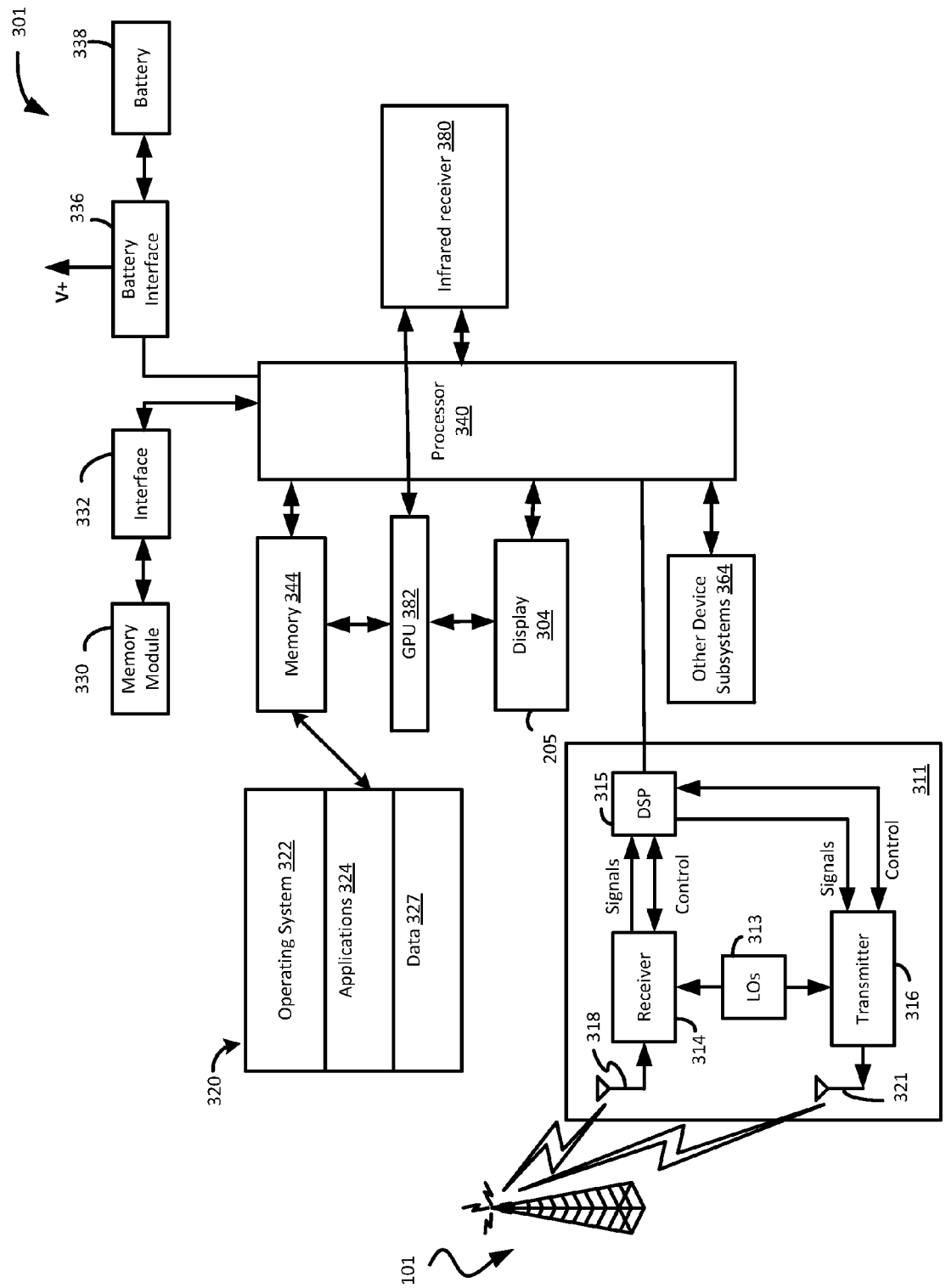
FIG. 3 is a block diagram of an example electronic device in accordance with example embodiments of the present disclosure.

Referring to FIG. 3 an exemplary embodiment of an electronic device 106 that implements an augmented-reality system is illustrated in greater detail. The electronic device 106 can be a wearable electronic device, such as a pair of glasses. The components of the electronic device 106 can be stored or supported in the arm of the glasses, for example. In one or more embodiments, the electronic device 106 can be a computer with a display screen, such as a digital camera, a mobile communication device or a table computer.

The electronic device 106 includes a processor 340, which controls general operation of the electronic device 106. The processor 340 can interact with additional device subsystems such as a display 304, a memory 344, a graphics processing unit (GPU) 382, an Infrared receiver 380 and any other device subsystems or peripheral devices generally designated at 364. The memory 344 can include a random access memory (RAM), a read only memory (ROM) or flash memory, for example. Other device subsystems 364 may include auxiliary input/output (I/O) subsystems (such as a keyboard, trackball, touchpad or optical sensor for example), a data port, a speaker, a microphone, a short-range communications subsystem such as Bluetooth® for example. The specific device subsystems 364 included on the electronic device 106 can depend on the nature of the electronic device 106. For example, if the electronic device 106 is a set of wearable glasses, then it may not include auxiliary I/O subsystems such as a keyboard or trackball.

In accordance with one or more embodiments, the processor 340 can interact with device subsystems such as a wireless communication subsystem 311 for exchanging radio frequency signals with a wireless network 101 to perform communication functions. Some of the subsystems shown in FIG. 3 perform communication-related functions, whereas other subsystems may provide "resident" on-device functions.

In one or more embodiments, the electronic device 106 may be equipped to send and/or receive data across a communication network (as shown at 101). In such embodiments the electronic device 106 includes a communication subsystem 311, which includes a receiver 314, a transmitter 316, and associated components, such as one or more embedded or internal antenna elements 318 and 321, local oscillators (LOs) 313, and a processing module such as a digital signal processor 315 (DSP). As will be apparent to those skilled in field of communications, the particular design of the communication subsystem 311 depends on the communication network 101 in which the electronic device 106 is intended to operate.

Operating system software used by the processor 340 may be stored in memory 344, which may include a persistent store such as flash memory (which may be a ROM), a ROM or similar storage element. The operating system, specific device applications, or parts thereof, may be temporarily loaded into a volatile store such as RAM, which may be included in memory 344.

The processor 340, in addition to its operating system functions, enables execution of software applications on the electronic device 106. A predetermined set of applications, which control basic device operations, can be installed on the electronic device 106 during its manufacture. These basic operations can include data communication applications, for example. Additionally, applications may also be loaded onto the communication device 106 through the network 101, or other subsystems such as an auxiliary I/O subsystem, a serial port, a short-range communications module, or any other suitable subsystem 364, and installed by a user in memory 344 for execution by the processor 340. Such flexibility in application installation increases the functionality of the electronic device 106 and may provide enhanced on-device features, communication-related features, or both.

Figure 4:
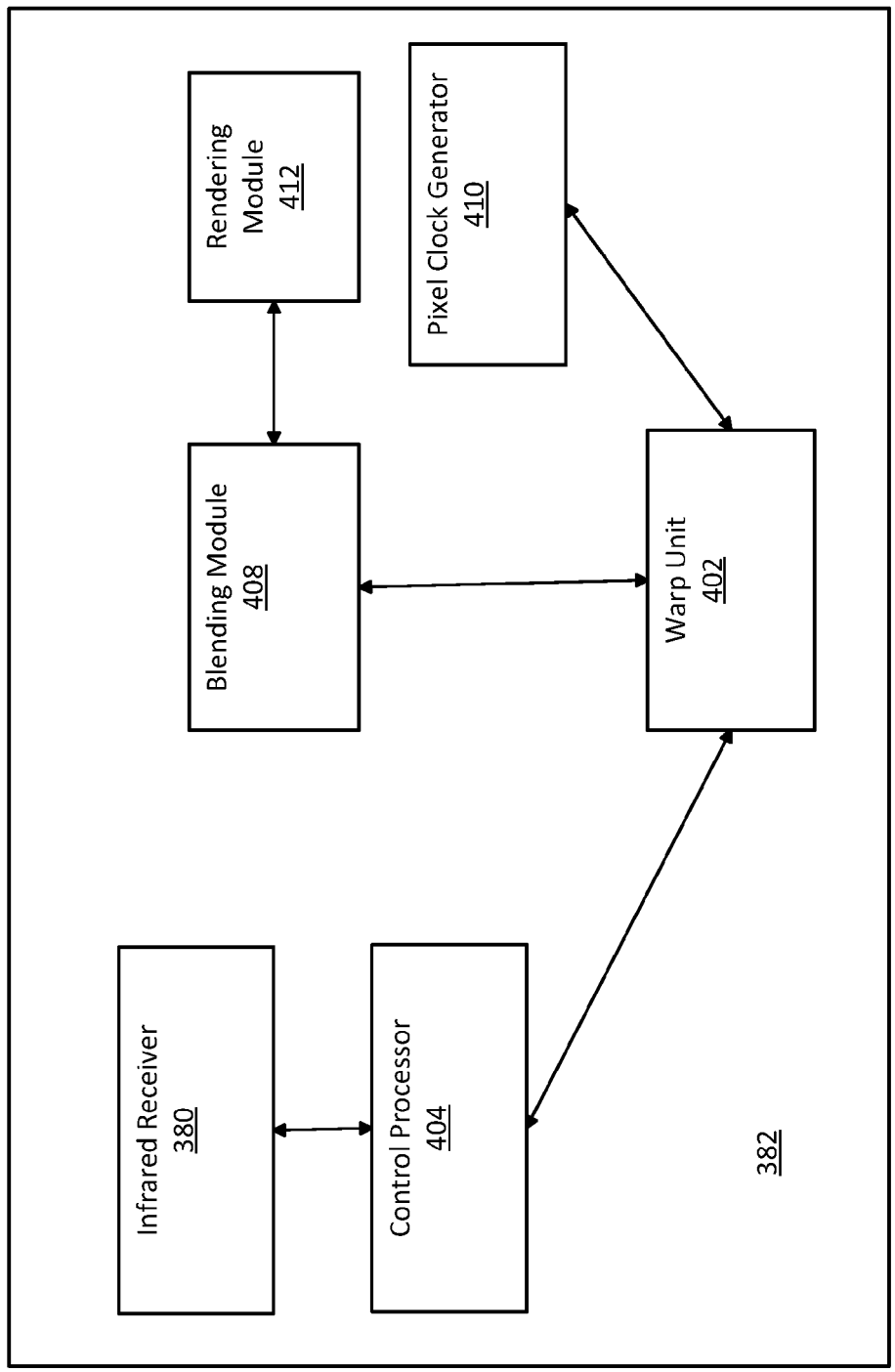
FIG. 4 is a schematic view of a graphics processing unit.

The infrared receiver 380 can include an infrared sensing device and associated circuits and components. The infrared receiver 380 can be configured to identify and locate the source of received infrared light. The received infrared light can be emitted from a source external to the electronic device 106. The Infrared receiver 380 is one example of a short range communication module that can be included on the electronic device 106. Such short range communication modules can provide for communication between the electronic device 106 and different systems or devices (such as the target member 104), which need not be similar devices. For example, the short range communication module may include a wireless bus protocol compliant communication mechanism such as a Bluetooth® communication module to provide for communication with similarly-enabled systems and devices. In one or more embodiments, the infrared receiver 380 can be located in the GPU 382 (as shown in FIG. 4). However, in one or more embodiments, the infrared receiver can be separate and apart from the GPU 382 (as shown in FIG. 3).

The GPU 382 is an electronic circuit that is adapted to configure or alter graphics for rendering on the display 304 as rendered images 108. For example, the GPU 382 can obtain or receive a graphic stored in memory 344 and alter the graphic before outputting it to the display 304.

The display 304 is used to visually present rendered images 108 to a user (e.g. the person 102). Further the display 304 may also be configured to visually present a view of the environment to a user. The display 304 configuration or type of the display 304 can depend on the type of electronic device 106. For example, if the electronic device 106 is a wearable electronic device such as set of glasses (as shown in FIGS. 1A and 1B), then the display 304 may be at least partially transparent so that the person 102 wearing the glasses can see the environment through the display 304 in addition to a rendered image 108 (although the rendered image 108 may not necessarily be present, as in FIG. 1A). By way of further example, if the electronic device 106 is a camera, the display 304 may be a screen on which an image captured by an image sensor in the camera is rendered. In yet a further example, if the electronic device 106 is a mobile computer containing a camera, then an application's graphical user interface (GUI) can be rendered or presented on the display 304 and/or an image captured by the image sensor of the camera can be rendered on the display 304. The view of an image captured by the camera may be considered the environment on top of which a rendered image 108 is displayed. The display 304 can show an environment, e.g. the view through a lens of a set of glasses or the view through a camera lens, and can also render an image 108 (i.e. an augmented-reality image) on top of the environment.

In some example embodiments, a device subsystem 364 such as the I/O subsystem may include an external communication link or interface, for example, an Ethernet connection. The electronic device 106 may include other wireless communication interfaces for communicating with other types of wireless networks.

In some example embodiments, the electronic device 106 also includes a removable memory module 330 (typically including flash memory) and a memory module interface 332. Network access may be associated with a subscriber or user of the electronic device 106 via the memory module 330, which may be a Subscriber Identity Module (SIM) card for use in a GSM network or other type of memory module for use in the relevant wireless network type. The memory module 330 may be inserted in or connected to the memory module interface 332 of the electronic device 106.

The electronic device 106 may store data 327 in memory 344, which in one example embodiment is an erasable persistent memory. In various example embodiments, the data 327 may include service data having information required by the electronic device 106 to establish and maintain communication with the wireless network 101. The data 327 may also include user application data such text (e.g. email messages, address book and contact information, calendar and schedule information, notepad documents), image files and other commonly stored user information stored on the electronic device 106 by its user, and other data.

In some example embodiments, the electronic device 106 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects an electronic device 106 to the host computer system via a USB cable or Bluetooth® connection, traffic that was destined for the wireless network 101 is automatically routed to the electronic device 106 using the USB cable or Bluetooth® connection. Similarly, any traffic destined for the wireless network 101 is automatically sent over the USB cable Bluetooth® connection to the host computer for processing.

The electronic device 106 also includes a battery 338 as a power source, which is typically one or more rechargeable batteries that may be charged, for example, through charging circuitry coupled to a battery interface 336 such as a serial data port. The battery 338 provides electrical power to at least some of the electrical circuitry in the communication device 106, and the battery interface 336 provides a mechanical and electrical connection for the battery 338. The battery interface 336 is coupled to a regulator (not shown) which provides power V+ to the circuitry of the electronic device 106.

A predetermined set of applications that control basic device operations, including data and possibly voice communication applications may be installed on the electronic device 106 during or after manufacture. Additional applications and/or upgrades to an operating system 322 or software applications 324 may also be loaded onto the electronic device 106 through the wireless network 101, an auxiliary I/O subsystem, a data port, a short range communication module, or other suitable device subsystems 364. The downloaded programs or code modules may be permanently installed; for example, written into the program memory 344, or written into and executed from a RAM for execution by the processor 340 at runtime.

In some example embodiments, the electronic device 106 operates in a data communication mode in which it may receive a data signal such as a text message, an email message, an image file or a webpage. The data signal can be downloaded across the network 101, for example, processed by the communication subsystem 311 and input to the processor 340 for further processing. For example, a downloaded webpage may be further processed by a web browser or an email message may be processed by the email messaging application and output to the display. The downloaded data can be then be rendered onto the display 304, for example.

In some example embodiments, the electronic device 106 may also operate in a voice communication mode, such as when the electronic device 106 is a cellular phone or smart phone or otherwise provides telephony functions. The overall operation is similar to the data communication mode, except that the received signals would be output to the speaker and signals for transmission would be generated by a transducer such as the microphone, which could both be associated with the electronic device 106. The telephony functions are provided by a combination of software/firmware (i.e., a voice communication module) and hardware (i.e., the microphone, the speaker and input devices). Alternative voice or audio I/O subsystems, such as a voice message recording subsystem, may also be implemented on the electronic device 106. Although voice or audio signal output may be accomplished primarily through the speaker, the display may also be used to provide an indication of the identity of a calling party, duration of a voice call, or other voice call related information.

The processor 340 operates under stored program control and executes software modules 320, such as applications 324 stored in memory 344 such as persistent memory. The software modules 320 may include operating system software 322, one or more additional applications 324 or modules and data 327. The processor 340 may also operate to process the data 327 stored in memory 344 associated with the electronic device 106.

Graphics Processing Unit 382

FIG. 4 is a block diagram of an exemplary embodiment of a graphics processing unit 382. The GPU can be a hardware-implemented component (e.g. a microchip, microprocessor or ASIC). The GPU 382 can include one or more modules such as one or more warp units 402, a control processor 404, an infrared receiver 380, a blending module 408, a pixel clock generator 410 and a rendering module 412. As noted above (and in FIG. 3), in an alternative embodiment, the infrared receiver 380 can be a component of the electronic device 106 that is not integral with or contained in the GPU 382. The modules included in the GPU 382 can be implemented on a single hardware component or on separate individual components (e.g. individual microchips).

The infrared receiver 380 receives infrared light from an external source. For example, the infrared receiver 380 can receive infrared light from the one or more LEDs 206 associated with the target member 104. The infrared receiver 380 receives the infrared light and can identify the relative location of the LEDs 206 (e.g. based on the brightness and location of the received infrared light). In one or more embodiments, the infrared receiver 380 may be able to identify or determine the three-dimensional location of the received infrared light in relation to the GPU 382. Using infrared light received at an infrared receiver 380 is one example of how a three-dimensional location of the target member 104 can be calculated or determined from orientation data.

The infrared receiver 380 is an example of a module of the GPU that can receive orientation data from an external reference. By way of further example, a gyroscope or an accelerometer or another sensor on the target member 104 and/or on the electronic device 106 can be used to receive or obtain orientation data, instead of or in addition to the infrared receiver 380. A sensor other than an infrared receiver 380 can obtain the orientation data from an external reference, such as the target member 104. The orientation data can be used to calculate or determine the orientation of the target member 104 relative to the electronic device 106.

The control processor 404 can receive the orientation data from the infrared receiver 380 or from another module or sensor on the electronic device 106. The control processor 404 uses the orientation data to identify a three-dimensional plane as defined by the orientation data. The three-dimensional plane is a planar region in three dimensions associated with the target member 104 and its location or orientation may be relative to the electronic device 106. For example, in the embodiment in which the LEDs 206 are located on a target member 104, the orientation data may include enough information to identify a three-dimensional plane defined by the target member 104. For example, in the case when the infrared receivers receive infrared signals from multiple sources (e.g. multiple LEDs 206), the orientation data can be used to define or determine points (or coordinates) in three-dimensional space. The coordinates of the points can be compared to reference coordinates in order to determine a three-dimensional plane defined by the points. The reference coordinates can be predefined or can be represented by a location of the points that define a flat two-dimensional plane (such as that shown in FIG. 5A, discussed below). The three-dimensional plane can be identified by an orientation matrix calculated based on the orientation data. For example, the three-dimensional plane may be identified by the orientation matrix as being relative to a two-dimensional surface (e.g. the display 304). Thus, the orientation matrix may be able to project or transform a coordinate-pair on a two-dimensional surface onto a coordinate-pair on the three-dimensional plane. Alternatively, the three-dimensional plane can be stored in a different format in memory 244 that is accessible by the processor 340 and/or GPU 382. The three-dimensional plane, as it is defined and stored in memory 244, can be such that the processor 340 and/or GPU 382 can determine whether a coordinate-pair is on the three-dimensional plane.

In one or more alternative embodiments, the infrared receiver 380 captures raw orientation data from the LEDs 206 on the target member 104. The control processor 404 analyzes the raw orientation data (as received at the infrared receiver 380) to identify bright spots and to compute the coordinate-pairs (e.g. (x,y) coordinates, or (x,y,z) coordinates) of the bright spots on a reference plane defined by the control processor 404. The reference plane can be a plane defined by the control processor 404, such as the plane defined by the display 304. The control processer 404 can access information (e.g. pre-stored in memory 244) that describes the distance between each of the LEDs 206 on the target member 104. For example, the memory 244 may indicate that two LEDs 206 on the target member 104 are separated by a distance of 3 inches. The distance between the coordinate-pairs of the LEDs' 206 bright spots on the reference plane can be compared to the distance between the LEDs 206 on the target member 104 (which was previously stored in memory 244 or which was communicated to the electronic device 106 by the target member 104) to determine an angle of the three-dimensional plane defined by the LEDs 206. Similarly, the relative angle of the coordinate-pairs of two bright spots on the reference plane can be compared to a predefined angle (e.g. horizontal or parallel to the Earth's surface) to determine an angle of the three-dimensional plane defined by the target member 104 (or by the LEDs 206 on the target member 104). Further, the relative brightness of the light received at the infrared receiver 380 can indicate which of the LEDs 206 is closer to the electronic device 106 which can indicate the direction of the angle of the three-dimensional plane defined by the LEDs 206.

In one or more embodiments, the target member 104 can include one or more sensors, such as a gyroscope and an accelerometer. Further the target member 104 can be an electronic device and can include a processor and memory (such as described above in relation to FIG. 3). The target member 104 can determine its orientation using the one or more sensors and can transmit the determined orientation to the electronic device 106 which can also receive infrared light from the LEDs 206 at the infrared receiver 380. The electronic device 106 can receive the orientation from the target member 104 or, alternatively, the electronic device 106 can receive the raw sensor data from the target member 104 and can calculate the orientation of the target member 104 using the transmitted raw sensor data. Either one or all of the calculated orientation or the raw sensor data may be considered orientation data. The electronic device 106 can use the orientation data received at the infrared receiver 380 from one or more LEDs 206 along with the orientation data of the target member 104 in order to determine the three-dimensional plane defined by the surface 204 of the target member 104. For example, the light received at the infrared receiver 380 two LEDs 206 can define the relative position or angle of two points on the target member 104 (or on the planar region), as described above, but it may not be able to define the rotation of the target member 104 about the line defined by the two points. The sensor data can be used to determine the rotation of the target member 104 (or planar region) about the line defined by the two points. Thus, the sensor data together with two LEDs 206 can be used to identify a three-dimensional plane defined by a line (e.g. connecting the two LEDs 206) and a rotation about that line (as determined using the sensor data). The electronic device 106 may also contain one or more sensors (e.g. gyroscope, accelerometer, magnetometer, etc.) in order to determine its orientation. The orientation of the electronic device 106 can be used to calculate the relative orientation of the target member 104. Using the relative orientation of the target member 104 and the relative location of the target member 104 (e.g. as determined from the LEDs 206), the electronic device 106 can define the three-dimensional planar region of the surface 204 of the target member 104.

In one or more embodiments, the target member 104 can contain 4 LEDs 206 that identify a three-dimensional plane defined by the target member 104. When the lights from the LEDs 206 are received at the infrared receiver 380 and processed at the control processor 404, the brightness and the relative positioning of the received LEDs 206 define a three-dimensional plane. The three-dimensional plane can be relative to the electronic device 106.

In accordance with one or more embodiments, the electronic device 106 can re-orient a coordinate-pair from its display 304 to be on the three-dimensional plane defined by the target member 104 by translating the coordinate-pair following the new location of the target member 104 (e.g. as determined from the infrared receiver 380) and by rotating the coordinate-pair using the relative orientation of the target member 104 (e.g. as determined from the sensors on the electronic device 106 and/or the target member 104).

In one or more embodiments, the electronic device 106 can impose a finite shape or finite boundary on the three-dimensional plane thereby defining a three-dimensional planar region. For example, the finite shape can correspond to the shape of the target member 104 or may be adjacent to the target member 104. By way of further example, the finite shape can be a rectangle, ellipse or other shape.

In one or more embodiments, the three-dimensional plane can be stored in memory 244 as an orientation matrix. The orientation matrix can transform a two-dimensional coordinate-pair on a surface onto the three-dimensional plane. In one or more embodiments, the coordinate-pairs represented by the orientation matrix and/or transform matrix can be homogeneous coordinates (e.g. (x,y,w) or (x,y,z,w)).

By way of example, an orientation matrix may take the following form:

$$\begin{bmatrix} V_{11} & V_{11} & V_{11} & Tx \\ V_{21} & V_{22} & V_{23} & Ty \\ V_{31} & V_{32} & V_{33} & Tz \\ 0 & 0 & 0 & 1 \end{bmatrix}$$

In the above example, $T_X$, $T_Y$, $T_Z$ represents a translation (using the centre of the target member 104 as the origin) and $V_{11}$ to $V_{33}$ represents a rotation. Thus, applying the above exemplary orientation matrix to a coordinate-pair on a two-dimensional surface results in a coordinate-triplet on a three-dimensional plane. As understood, the coordinate-pair on the two-dimensional surface may be represented in homogeneous coordinates as (X, Y, 0, W), with the z-coordinate equal to 0.

The orientation matrix (or the representation of the three-dimensional plane, as stored in memory 244) can be used to calculate a transform matrix. Or, in accordance with one or more embodiments, the transform matrix may include the orientation matrix (such as the above exemplary matrix) and a perspective projection matrix. The transform matrix may also be identified as an inverse transform matrix. The transform matrix includes a projection (or inverse projection) of a three-dimensional planar region onto a two-dimensional flat surface. The three-dimensional planar region may be the portion of the three-dimensional plane that has a finite boundary imposed on it (i.e. the portion of the three-dimensional plane that is defined by the finite shape imposed on it). The transform matrix (e.g. including the orientation matrix) can be applied to a set of display pixel coordinate-pairs (e.g. pixel coordinate-pairs or locations on a display) to determine a set of graphic pixel coordinate-pairs (e.g. pixel coordinate-pairs on a two-dimensional plane or two-dimensional planar region). A coordinate-pair can be a location of a pixel on a display screen for example. For example, coordinate-pairs may be stored as (x,y) pairs. By way of further example, the coordinate-pairs may be stored as (x,y,0) triplets or as (x,y,0,w) homogeneous coordinates. The display pixel coordinate-pairs represent coordinate-pairs on the display 304. The graphic pixel coordinate-pairs represent coordinate-pairs on one or more graphics stored in memory (e.g. in a digital file). When the transform matrix is applied to a set of display pixel coordinate-pairs the result is a set of coordinate-pairs from the graphic (i.e. a set of graphic pixel coordinate-pairs) that have been projected onto the three-dimensional planar region that is defined from the three-dimensional plane. The transform matrix can be a combination of one or more of a rotation matrix, a scaling matrix and a perspective projection matrix, which can be determined based on the difference between the three-dimensional planar region associated with the three-dimensional plane as defined by the orientation data and the two-dimensional surface of the display screen 304. (A three-dimensional planar region that is associated with a three-dimensional plane can be a three-dimensional planar region that results from the three-dimensional plane having a boundary imposed on it). For example, the transform matrix may include the orientation matrix together with a perspective projection matrix projecting the three-dimensional planar region onto a two-dimensional surface (e.g. the display 304).

The boundary imposed on the three-dimensional plane may be determined from the orientation data or otherwise from the target member 104. For example, the boundary may be a pre-defined shape (such as a rectangle or triangle) with the corners of the target member 104 identified by LEDs 206. In one or more embodiments, the boundary is defined by a projection matrix included as part of the transform matrix. Thus, the three-dimensional planar region may be defined by the target member 104.

By way of further example, the transform matrix may include the orientation matrix, shown above, with a projection matrix that has the following format:

$$\begin{bmatrix} P_{11} & P_{12} & P_{13} & 0 \\ 0 & P_{22} & P_{23} & 0 \\ 0 & 0 & 1 & 0 \\ 0 & 0 & 0 & 1 \end{bmatrix}$$

Where $P_{11}$ to $P_{23}$ are perspective transformation elements. Thus, an example of the application of the transform matrix (including the orientation matrix and perspective projection matrix) to a coordinate-pair is as follows:

$$\begin{bmatrix} P_{11} & P_{12} & P_{13} & 0 \\ 0 & P_{22} & P_{23} & 0 \\ 0 & 0 & 1 & 0 \\ 0 & 0 & 0 & 1 \end{bmatrix} \begin{bmatrix} V_{11} & V_{11} & V_{11} & Tx \\ V_{21} & V_{22} & V_{23} & Ty \\ V_{31} & V_{32} & V_{33} & Tz \\ 0 & 0 & 0 & 1 \end{bmatrix} \begin{bmatrix} X \\ Y \\ 0 \\ W \end{bmatrix}$$

In accordance with one or more embodiments, the initial coordinate-pairs represent coordinates on the display 304 and the final coordinate-pairs (after application of the transform matrix including the orientation matrix) represent corresponding coordinate-pairs of the graphic as projected onto the three-dimensional planar region represented on the display 304.

By way of further example, the transform matrix can transform the set of display pixel coordinate-pairs to a coordinate system representative of the three-dimensional plane associated with the target member 104 (e.g. as defined by the orientation data) where an origin of the coordinate system could be a point on the target member 104 (such as its center). The transform matrix can also include a projection of the three-dimensional planar region associated with the target member 104 (and associated with the three-dimensional plane) onto a graphic pixel coordinate system. The graphic pixel coordinate system can be the flat (or two-dimensional) coordinate system on which graphics are stored. The transform matrix may also include one or more translations (or position offset from the origin) and scaling, for example. The result of the application of the transform matrix is a set of graphic pixel coordinate-pairs that correspond to the display pixel coordinate-pairs projected onto the three-dimensional planar region associated with the target member 104.

Accordingly, in one or more embodiments, the transform matrix may be calculated using the orientation data. The transform matrix can be applied to orient the set of display pixel coordinate-pairs on the three-dimensional plane associated with the orientation data and then to identify the set of graphic pixel coordinate-pairs projected onto the three-dimensional planar region that corresponds to the set of display pixel coordinate-pairs on the three-dimensional plane.

Reference herein to the application of the transform matrix may include the application of the orientation matrix along with a perspective projection matrix. It is understood that perspective projection matrices may have other forms, as the above example is only for illustrative purposes.

In one or more embodiments, the control processor 404 is not contained in the GPU 382 and is instead a separate component on the electronic device 106.

The warp unit 402 is connected to the control processor 404, memory 344 and the blending module 408. The warp unit 402 receives the transform matrix and a set of display pixel coordinate-pairs from the control processor 404. For example, the set of display pixel coordinate-pairs received at the warp unit 402 can be a row of pixel coordinate-pairs, such as the top row on the display 304. A row may also be referred to as a scan-line. By way of further example, the set of display pixel coordinate-pairs received at the warp unit 402 can be a single pixel coordinate-pair on the display 304. The warp unit 402 applies the transform matrix to the set of display pixel coordinate-pairs to determine a set of graphic pixel coordinate-pairs that are projected onto the three-dimensional planar region associated with the orientation data. The warp unit 402 can then retrieve the set of graphic pixel data associated with the graphic pixel coordinate-pairs. The graphic pixel data can be RGB values, for example. By way of further example, the graphic pixel data for a specific graphic pixel coordinate-pair can be the RGB value for the pixel located at the specific graphic pixel coordinate-pair.

In accordance with one or more embodiments, the GPU 382 may include more than one warp unit 402. Each warp unit 402 may be associated with a graphic element (e.g. a component or feature of a graphic file) or a separate graphic stored in memory (e.g. a separate graphic file). Each separate warp unit 402 can receive the same display pixel coordinate-pairs. Each separate warp unit 402 can receive a separate transform matrix. For example, the control processor 404 may calculate transform matrices for each warp unit 402. The transform matrixes are applied to the display pixel coordinate-pairs at the warp unit 402. The transform matrices may be the same or may be different for each warp unit 402. For example, a second warp unit 402 can apply a second transform matrix associated with a second three-dimensional planar region such that the image component (or image) associated with the second warp unit 402 will be projected onto the planar region associated with that warp unit 402. By way of further example, the second transform matrix can be applied to the set of display pixel coordinate-pairs to determine a second set of graphic pixel coordinate-pairs, which can in turn be used to fetch or retrieve a second set of graphic pixel data. A second set of display pixel data based on the retrieved second set of graphic pixel data can then be determined for rendering on the display. After the transform matrix is applied to the set of display pixel coordinate-pairs, the warp unit 402 fetches the set of graphic pixel data that is associated with the set of graphic pixel coordinate-pairs and based on the set of graphic pixel data determines the display pixel data to be rendered on the display pixel coordinate-pairs. Thus multiple warp units 402 can be used to represent multiple three-dimensional planar regions (through the application of multiple transform matrices). The warp unit 402 can also include (or be in communication with) a pixel-fetch module that can retrieve a set of graphic pixel data from a graphic stored in memory with the set of graphic pixel data being associated with the set of graphic pixel coordinate-pairs.

In one or more embodiments, more than one transform matrix will be applied to each set of display pixel coordinate-pairs. For example, a first transform matrix can transform a two dimensional graphic to a specific location and a second transform matrix can translate, scale and/or rotate the graphic. In one or more embodiment, the infrared receiver 380 is external to the GPU 382, the first transform matrix is calculated at the GPU 382 and applied at the warp unit 402 in the GPU 382 as described herein, and the second transform matrix can be calculated at the processor 340 and applied at the warp unit 402.

The calculation of the transform matrix at the control processor 404 may be performed in parallel with the calculation of the set of graphic pixel coordinate-pairs performed at the warp unit 402. For example, while the warp unit 402 is calculating the set of graphic pixel coordinate-pairs (e.g. while the transform matrix is being applied to the set of display pixel coordinate-pairs), the control processor 404 may be calculating a subsequent transform matrix based on further orientation data subsequently obtained using an external reference. By way of further example, the orientation data may be obtained at predefined intervals. In yet a further example, rate of sampling (or obtaining) the orientation data can be increased in proportion to the rate of change of the orientation data.

The blending module 408 is connected to the one or more warp units 402. In one or more embodiments, the blending unit is in communication with a pixel-fetch module (which may itself form part of the warp unit 402) which can retrieve the set of graphic pixel data associated with the determined set of graphic pixel coordinate-pairs. The blending module 408 can receive the set of graphic pixel data associated with the set of graphic pixel coordinate-pairs from the one or more warp units 402 (or from the pixel-fetch module associated with the warp unit 402 as the case may be). The blending module 408 determines the set display pixel data based on the set of graphic pixel data. The set of display pixel data can be associated with the set of display pixel coordinate-pairs. There may be more than one graphic pixel data in the set of graphic pixel data. The blending module 408 determines the display pixel data associated with a display pixel coordinate-pair based on set of graphic pixel data, which may include multiple graphic pixel data. Thus the multiple graphic pixel data associated with a single display pixel coordinate-pair may be combined at the blending module 408. For example, the set graphic pixel data received from the one or more warp matrices 402 may be associated with one or more graphic pixel coordinate-pairs form one or more graphics stored in memory or one or more graphic components.

The rendering module 412 is for rendering the set of data pixel data on the display 304. The rendering module 412 may be connected to the blending module 408. In one or more embodiments, the rendering module may be in communication with the warp unit 402 and may form part of the blending module 408. In one or more embodiments, the rendering module 412 receives the set of display pixel data from the blending module 408. The rendering module 412 may also receive the corresponding set of display pixel coordinate-pairs from the blending module 408 (or from the warp unit 402). The rendering module 412 may cause the each display pixel datum in the set of display pixel data to be rendered at its associated display pixel coordinate-pair (e.g. from the set of display pixel coordinate-pairs).

The pixel clock generator 410 is connected to the one or more warp units 402. The pixel clock generator 410 dictates or instructs the warp units 402 when to fetch then set of graphic pixel data from memory thereby synchronizing the fetching of graphic pixel data.

Figure 5A:
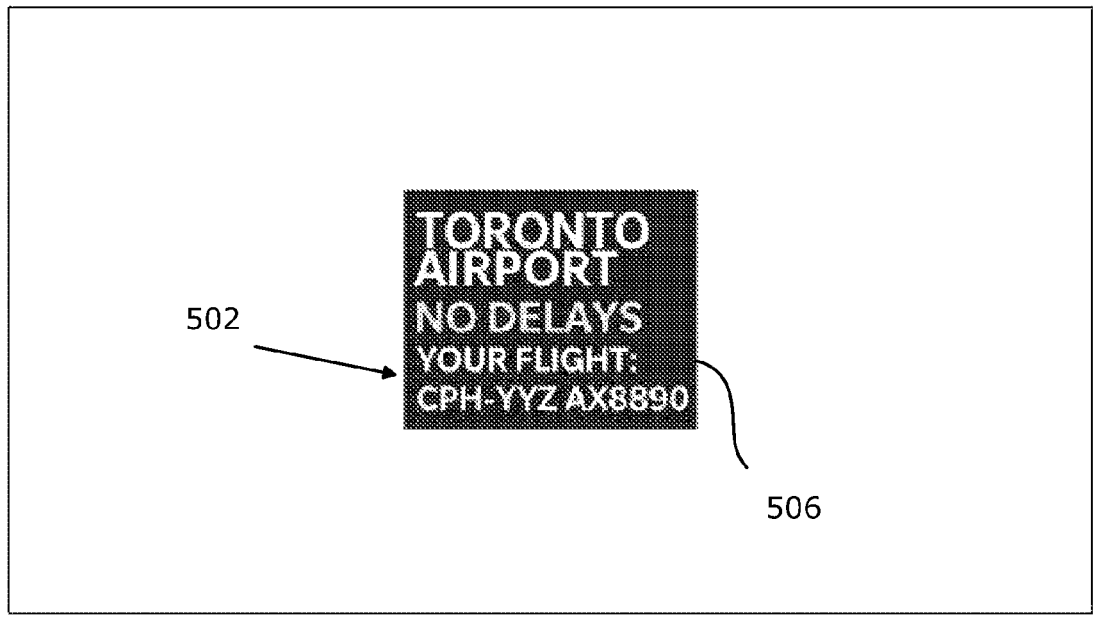
FIG. 5A shows an exemplary image on a two dimensional surface.
Figure 5B:
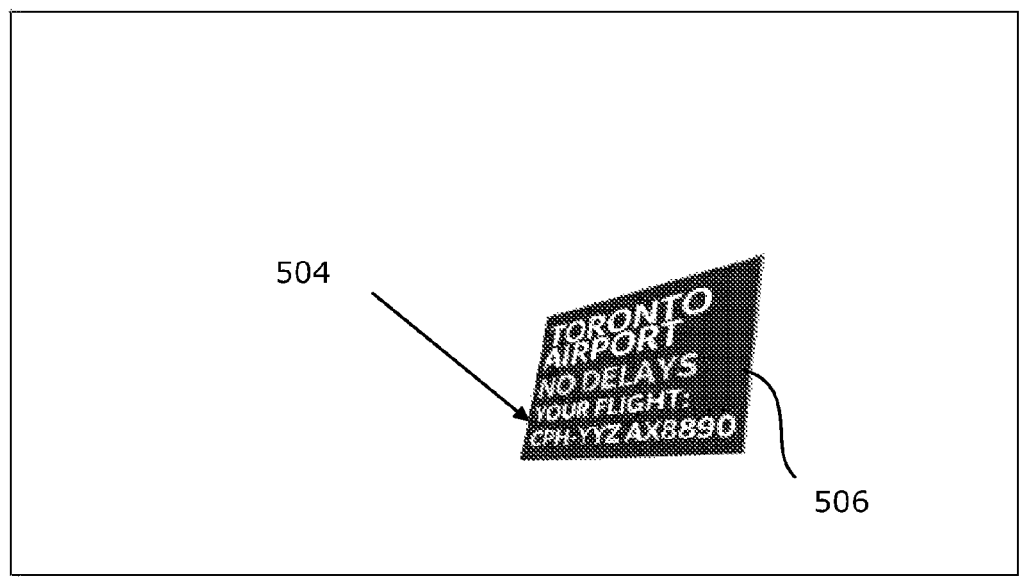
FIG. 5B shows an exemplary image projected onto a planar region.

The operation of the transform matrix will now be explained in more detail. FIG. 5A is a representation of a graphic 506 stored in memory 344. The graphic 506 in FIG. 5A is a two-dimensional image 108 with coordinate-pairs representing locations on the graphic 506 in memory. FIG. 5B is the same graphic 506 shown projected onto a three-dimensional planar region on the display 304. Thus, the graphic 506 on the display in FIG. 5B may be considered a rendered image 108. The coordinate-pairs shown in FIG. 5B represent the coordinates on the display 304. The transform matrix can be applied to a pixel from the display 304 such as that identified at 502 in FIG. 5B and performs a reverse projection of that pixel from the planar region to the two dimensional graphic plane in order to obtain the coordinate-pair from the graphic 506 in memory (e.g. the graphic 506 shown in FIG. 5A) which can be identified at coordinate-pair 502.

Warp Unit 402

Figure 6:
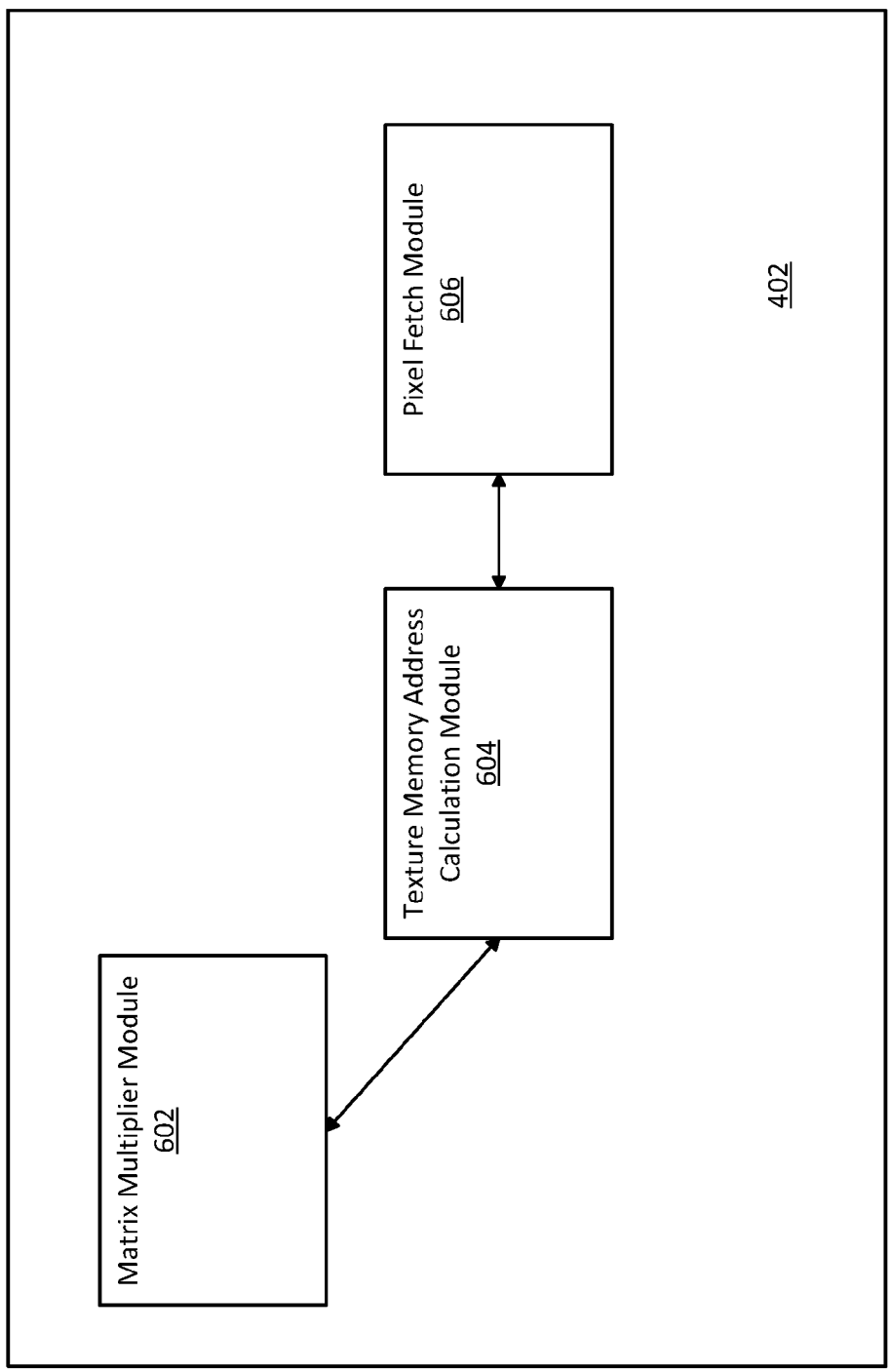
FIG. 6 is a schematic view of a warp unit.

FIG. 6 shows an embodiment of the warp unit 402 of the GPU 382 in more detail. The warp unit 402 includes a matrix multiplier module 602, a texture memory address calculation module 604, and a pixel-fetch module 606.

The matrix multiplier module 602 receives a transform matrix from the control processor 404. The matrix multiplier module 602 can also receive the set of display pixel coordinate-pairs from the control processor 404. The timing of the receipt of the display pixel coordinate-pairs may be controlled by the pixel clock generator 410. The matrix multiplier module 602 applies the transform matrix to the set of display pixel coordinate-pairs in order to obtain a set of graphic pixel coordinate-pairs. The set of graphic pixel coordinate-pairs may be a set of (x,y) coordinate-pairs, for example. Each (x,y) coordinate-pair in the set may identify an (x,y) position on a graphic (e.g. on a graphic 506 in a digital file as in FIG. 5A), for example. For example, the matrix multiplier can apply the transform matrix to the coordinate-pair identified at 504 in FIG. 5B in order to obtain the coordinate-pair identified at 502 in FIG. 5A.

The texture memory address calculation module 604 receives the set of graphic pixel coordinate-pairs from the matrix multiplier module 602 and determines the address(es) in memory 344 of the set graphic pixel data associated with the set of graphic pixel coordinate-pairs. For example, the set of graphic pixel coordinate-pairs (which can be (x,y) coordinate-pairs of an image) can be used to identify locations of data in memory which correspond to the graphic pixel coordinate-pairs. The data can be RGB values.

The pixel-fetch module 606 is in communication with the matrix multiplier module 602 and memory 344. The pixel-fetch module 606 receives the address(es) in memory 344 associated with the set of graphic pixel coordinate-pairs from the texture memory address calculation module 604. The pixel-fetch module 606 retrieves from memory 344 the set of graphic pixel data associated with the set of graphic pixel coordinate-pairs. For example, the pixel-fetch module 606 retrieves the RGB values located at the address(es) in memory 344 received from the texture memory address calculation. After retrieving the set of graphic pixel data associated with the set of graphic pixel coordinate-pairs from memory 344, the pixel-fetch module 606 can transmit the graphic pixel data to the blending module 408. The warp unit 402 (or the pixel-fetch module 606 for example) can also transmit the set of display pixel coordinate-pairs to the blending module 408.

In one or more embodiments, the warp unit 402 transmits the set of display pixel coordinate-pairs along with the set of graphic pixel data retrieved by the pixel-fetch module 606 to the blending module 408. The warp unit 402 may also associate specific display pixel coordinate-pairs with graphic pixel data retrieved by the pixel-fetch module 606. For example, each time the pixel-fetch module 606 retrieves graphic pixel data for a graphic pixel coordinate-pair (e.g. from the set of graphic pixel coordinate-pairs), the pixel-fetch module 606 may associate the graphic pixel data with the graphic pixel coordinate-pair. The association between the graphic pixel coordinate-pair and the graphic pixel data may be stored in memory. Thus the blending module 408 may also receive an identification of the graphic pixel data that is associated with each specific display pixel coordinate-pair in the set of display pixel coordinate-pairs.

Operation

Figure 7:
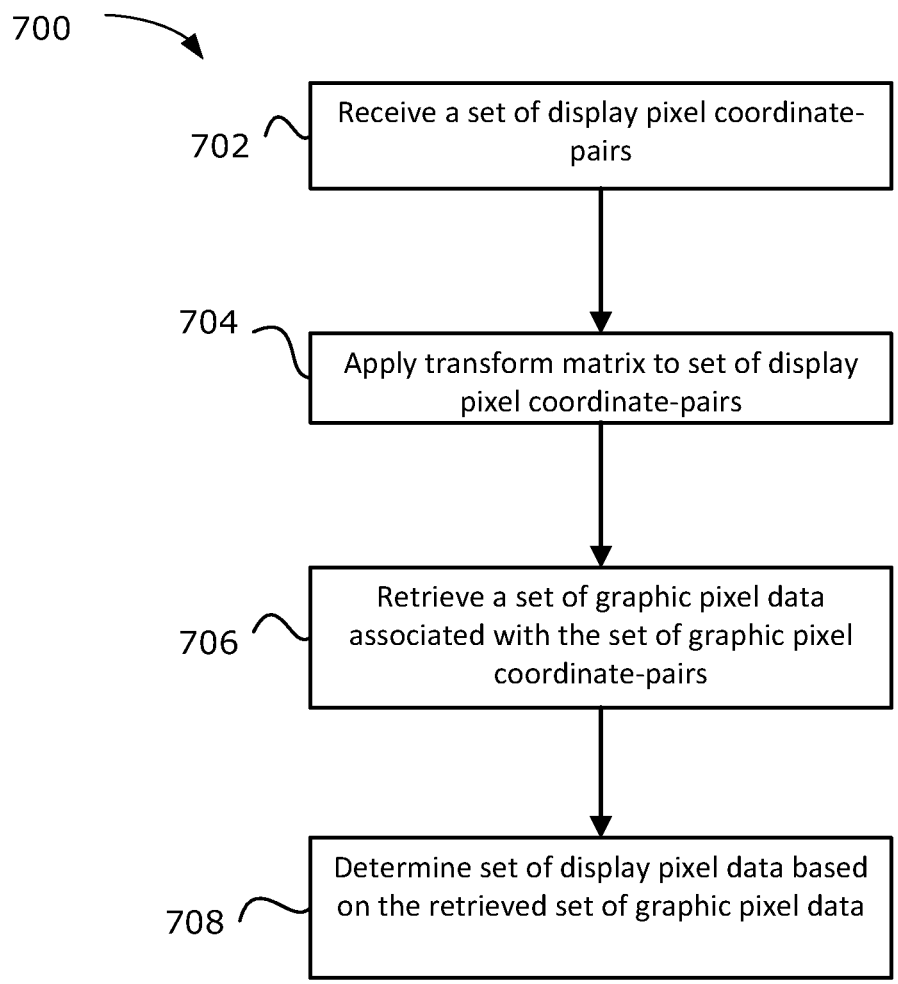
FIG. 7 is a flowchart depicting a method of generating display pixel data for rendering a representation of a graphic on a display.

FIG. 7 depicts a method 700, implemented on a graphics processing unit 382, of generating display pixel data for rendering a representation of a graphic on a display 304. The display 304 can be one or more lenses of glasses, a camera lens or a screen of an electronic device 106 for example. The display pixel data can be RGB values and corresponding display pixel coordinate-pairs, for example. In accordance with one or more embodiments, the display 304 is transparent, such as a lens of wearable glasses. The graphics processing unit 382 can be associated with the wearable glasses. By way of further example, the display 304 can include a first display portion, viewable by a first eye of a wearer of the glasses, and a second display portion, viewable by a second eye of the wearer of the glasses. The graphic that is generated to output on the display 304 can itself have transparent, opaque or translucent portions. Further, the graphic that is generated to output on the display 304 may be sized to only cover a portion of the display 304. The remaining portion of the display 304 may remain transparent such that the generated graphic, when output on the display 304, is superimposed over a portion of the display 304.

In one or more exemplary embodiments, the graphic can be generated based on an electronic file stored in memory, such as a file in .tiff, .bmp or .jpg formats. By way of further example, the graphic can be generated based on a component of an electronic image file. A component of an electronic file can be delineated in the electronic file itself. For example, an element of text in a graphic file (e.g. in an electronic file) can be delineated in that graphic file as being a separate graphic component. The graphic can be generated from this separate graphic component. By way of further example, the graphic to be generated can be based on separate graphic components of a video file stored in memory. By way of further example, the graphic can be generated from data received over a network 101. For example, the graphic can be an email message, a photograph or another type of file received over a communication network 101 such as the Internet. The generated graphic can be rendered on the display 304 as the rendered image 108, for example.

The method 700 can be implemented on the GPU 382. The GPU 382 can be associated with or connected to or integral with a member that contains or supports the display 304. For example, the display 304 can be the first display portion of the glasses and the member that contains the display 304 can be the wearable glasses. The GPU 382 can be contained in an arm of the wearable glasses, for example. By way of further example, the display 304 can be a display screen on a mobile electronic device (e.g. a smart phone or tablet computer) and the GPU 382 can be contained within the mobile electronic device.

At 702, a set of display pixel coordinate-pairs is received at the GPU 382. In accordance with an embodiment, the set of display pixel coordinate-pairs is a row or scan-line of pixel coordinate-pairs on the display 304. For example, the set of display pixel coordinate-pairs can be the top row of the display 304. In accordance with an embodiment, the set of display pixel coordinate-pairs comprises a single pixel coordinate-pair.

At 704, a transform matrix is applied to the set of display pixel coordinate-pairs to obtain a set of graphic pixel coordinate-pairs. For example, the transform matrix can be multiplied with a pixel coordinate-pair from the set of display pixel coordinate-pairs to calculate a further pixel coordinate-pair. When the transform matrix is multiplied with each pixel coordinate-pair from the set of display pixel coordinate-pairs, the result is a further set of pixel coordinate-pairs. The further set of pixel coordinate-pairs is the set of graphic pixel coordinate-pairs identifying a set of pixel coordinate-pairs of graphic stored in memory 344. In other words, the further set of pixel coordinate-pairs represents coordinate-pairs for graphic stored in memory. The sets of pixel coordinate-pairs can be (x,y) coordinates on a two-dimensional plane, for example. In one or more example, one or more of the obtained graphic pixel coordinate-pairs may not be an integer values and may instead include fractions or real numbers. In such a situation, obtaining a set of graphic pixel coordinate-pairs can include rounding up or rounding down the fraction or real numbers in order to obtain integer values if necessary.

The transform matrix can be calculated using orientation data received from an external reference. As described above, the transform matrix can be calculated at the control processor 404. The orientation data can be received at the infrared receiver 380 from the target member 104. The target member 104 is an example of an external reference. Additional data can be transmitted from the external reference. For example, orientation data representing the orientation of the external reference can be transmitted from the external reference to the electronic device 106. The orientation data can be determined at the external reference by one or more of a gyroscope, accelerometer and magnetometer, for example. The orientation data may also include relative orientation of the electronic device 106 (e.g. relative to the target member 104) as determined by sensors (e.g. a gyroscope, accelerometer and/or magnetometer) on the electronic device 106. The infrared receiver 380 can be on the wearable glasses or otherwise attached to the electronic device 106 that supports or contains the display 304. The raw orientation data can include the raw infrared input received from the LEDs 206. The control processor 404 can use the raw orientation data from the infrared receiver 380 along with the orientation data from the sensors on the external reference and/or on the electronic device 106 to define a three-dimensional planar region and/or a three-dimensional plane. For example, the control processor 404 can use the relative positioning of two or more infrared light signals received at the infrared receiver 380 as compared to a reference relative positioning along with the orientation data from the sensors on the external reference and/or on the electronic device 106 to determine the transformation of the three-dimensional plane between the reference positioning and the positioning defined by the received infrared light signals and orientation data. The reference positioning may be representative of a certain planar region (such as the two dimensional planar region of the display 304, or a flat surface) on the display 304. By way of further example, the reference positioning may be such that two coordinate-pairs (corresponding to the locations of the LEDs 206 when the electronic device is in a reference position) are on a horizontal plane (relative to the display 304) at a distance of 3 cm apart, whereas the received infrared light signals may be at an angle of 25 degrees and 2 cm apart. The control processor 404 (or other component of the electronic device 106) can also determine the rotation of the external reference (or target member 104) relative to the electronic device 106 using the orientation data received at the sensors on the external reference (and transmitted from the external reference) as compared to the orientation of the electronic device 106 (as determined by the sensors on the electronic device 106). From this relative positioning and from the relative rotation information the control processor 404 can calculate an orientation matrix to identify the three-dimensional plane of the received infrared light signals and to identify the transformation between the reference positioning and the new positioning. The orientation matrix can therefore identify the three-dimensional plane defined by the external reference relative to the electronic device 106. The control processor 404 can then calculate a transform matrix based on the three-dimensional planar region associated with the three-dimensional plane as defined by the orientation data.

The transform matrix can be used to calculate the original location (i.e. the coordinate-pair(s) on the two-dimensional or flat image file) of input coordinate-pairs on a display 304 if the image 108 is to be projected onto the three-dimensional planar region associated with the orientation data and rendered on the display on the three-dimensional planar region. The three-dimensional planar region may be a finite region, such as a rectangle or other shape (rather than an infinite plane). If the transform matrix identifies pixel coordinate-pairs that are not on the image 108 then such pixel coordinate-pairs will be returned as a null value. Null values for pixel coordinate-pairs may be treated as void of any pixel data and as such will not render any data on the display 304. Thus, for example, if the display 304 is the first display portion (e.g. a lens) on a pair of glasses then any null values for display pixel coordinate-pairs will remain transparent. The application of the transform matrix to a set of display pixel coordinate-pairs can include the application of the orientation matrix. For example, the orientation matrix may be applied to the set of display pixel coordinate-pairs to determine the location of the coordinate-pairs on the three-dimensional plane, and then the transform matrix may be applied to project (in a perspective projection) the three-dimensional coordinate-pairs onto two-dimensional graphic pixel coordinate pairs. It is recognized that that the resulting graphic pixel coordinate pairs may be non-integers or fractional values. The non-integer or fractional values can be rounded up or rounded down, for example, to obtain integer values for the graphic pixel coordinate-pairs if necessary.

In one or more embodiments, there are multiple transform matrices on multiple warp units 402. For example, there may be multiple warp units 402 in the GPU 382 associated with multiple graphic elements or graphic files, with different warp units 402 receiving different transform matrices. Each warp unit 402 (and each transform matrix) may represent different three-dimensional planar regions or different transformations or projections of the image stored in memory 344. For example, different transform matrices can be applied to different graphic elements in order to determine the coordinate-pairs of each graphic element that will be projected to the three-dimensional planar region represented by a transform matrix. Different warp units 402 can apply the different transform matrices.

In accordance with an exemplary embodiment, each warp unit 402 can apply one or more additional custom matrix to the set of display pixel data and/or the set of display pixel coordinate pairs. For example, the custom matrix can alter the display pixel data in order to implement one or more effects onto the graphic (such as altering the colour of the display pixel data and hence the graphic). The custom matrix may also be applied so as to alter the appearance of an graphic element. The custom matrix can be a predetermined custom matrix.

In accordance with one or more embodiments, different warp units 402 can apply the same transform matrices in parallel in addition to applying different custom matrices.

At 706, a set of graphic pixel data associated with the set of graphic pixel coordinate-pairs is retrieved. For example, set of graphic pixel coordinate-pairs can be a set of coordinate-pairs (e.g. (x,y) coordinates) for an graphic stored in memory 144. Each graphic pixel coordinate-pair can have graphic pixel data associated with it. The graphic pixel data can be RGB values, for example. The RGB values can represent the red, green and blue colour components of the data rendered at the associated graphic pixel coordinate-pair when the graphic is displayed. The displayed graphic (e.g. the graphic rendered on the display) may consist of a portion of or may be an entire rendered image 108. The set of graphic pixel data can therefore include all of the graphic pixel data that is associated with all of the graphic pixel coordinate-pairs in the set of graphic pixel coordinate-pairs.

The transform matrix applied to the set of display pixel coordinate-pairs may identify certain graphic pixel coordinate-pairs that are not on the three-dimensional planar region on the display 304. In such a situation the graphic pixel coordinate-pairs may be identified as null values, and the corresponding graphic pixel data may be identified as null. A null graphic pixel coordinate-pair may be rendered as a transparent pixel or may not be rendered at all, for example. Thus if the display 304 is the first display portion and the second display portion (e.g. lenses) of the wearable glasses then no RGB values will be superimposed over locations of null valued display pixel coordinate-pairs.

At 708, a set of display pixel data is determined based on the retrieved set of graphic pixel data for rendering on the display 304. In accordance with an embodiment, the set of display pixel coordinate-pairs comprise a single coordinate-pair and the set of display pixel data comprise data associated with the single coordinate-pair. In such a situation, the display pixel data can be the same as the graphic pixel data. In accordance with another embodiment, the set of graphic pixel data can comprise more than one graphic pixel datum. Each retrieved graphic pixel data point (or datum) can be associated with a display pixel coordinate-pair. For example, more than one graphic pixel data point can be associated with the same display pixel coordinate-pair. In such a situation, the multiple graphic pixel data are transmitted to the blending module 408 where a single display pixel data point for rendering on a single display pixel coordinate-pair is determined based on the multiple graphic pixel data points. In one or more embodiments a normal alpha blending mode can be used. In one or more embodiments a premultiplied alpha blending mode where the graphic already has all colour values multiplied with alpha values can be used. In one or more embodiments, fragments or graphic pixel data are sorted by depth (e.g. of the corresponding graphic pixel coordinate-pair), with the fragment furthest away from the display 304 being first blended at the blending module 408.

In accordance with another embodiment, the multiple graphic pixel data points associated with the display pixel coordinate-pair can be retrieved from more than one graphic or from more than one graphic element of one or more graphics stored in memory 344.

After the graphic pixel data are blended thereby resulting in display pixel data for each coordinate-pair in the set of display pixel coordinate-pairs the display pixel data can be rendered on the display 304 at the associated display pixel coordinate-pair.

The method 700 described in respect of FIG. 7 can be repeated. For example, the first set of display pixel coordinate-pairs can be the top row of the display 304; the second set of display pixel coordinate-pairs can be the second from top row of the display 304 the third set of display pixel coordinate-pairs can be the third from top row of the display 304; and so on. A new transform matrix can be calculated for each new display pixel coordinate-pair. Similarly, the new transform matrix can be calculated on newly obtained orientation data. The new transform matrix can be calculated while the previous set of display pixel data is being generated. In one or more embodiments, the subsequent display pixel coordinate-pairs can be exclusive of the previous display pixel coordinate-pairs.

In one or more embodiments, a further transform matrix can be applied to the set of display pixel coordinate-pairs to obtain a further set of graphic pixel coordinate-pairs. The further transform matrix can be calculated using orientation data received from the external reference (e.g. LEDs 206 on the target member 104). The further transform matrix can be associated with a second three-dimensional planar region on the display. The second three-dimensional planar region can be different from the three-dimensional planar region. For example, the further transform matrix can include a different perspective projection matrix from the transform matrix. The different perspective projection may be based on predetermined data (such as a desired relative angle between the three-dimensional planar region and the second three-dimensional planar region). However, in one or more embodiments, the transform matrix and the further transform matrix may be based on (or determined using) the same orientation data. A further set of graphic pixel data associated with the further set of graphic pixel coordinate-pairs can then be retrieved. For example, the graphic pixel data can be retrieved from memory. A further set of display pixel data based on the retrieved further set of graphic pixel data can then be determined. This further display pixel data can be rendered on the display 304 on the second three-dimensional planar region and the display pixel data that was associated with the determined graphic pixel coordinate-pairs can be rendered on the three-dimensional planar region. Thus, the display pixel data and the further display pixel data can be rendered on different three-dimensional planar regions.

Figure 8:
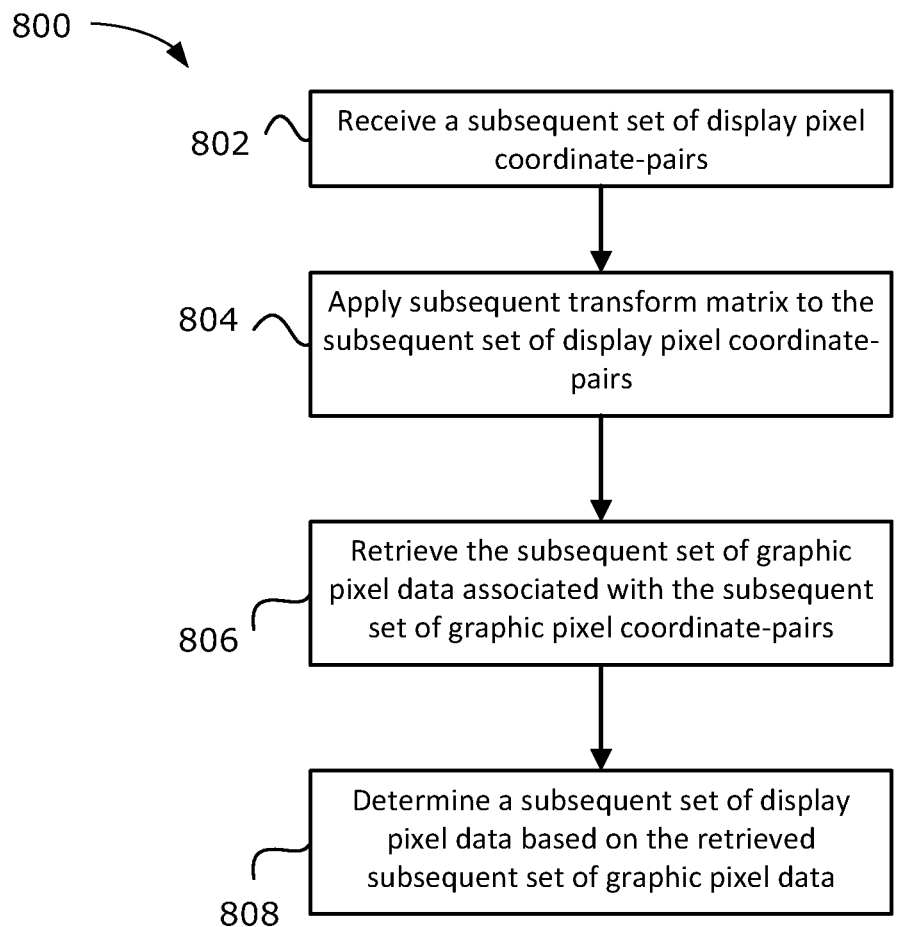
FIG. 8 is a flowchart depicting a method of generating display pixel data for rendering a representation of a graphic on a display.

In accordance with an exemplary embodiment, FIG. 8 depicts a method 800, implemented on a graphics processing unit 382, of generating display pixel data for rendering a representation of a graphic on a display 304 that is performed after the method 700 of FIG. 7.

At 802, a subsequent set of display pixel coordinate-pairs is received after retrieving the set of graphic pixel data associated with the set of graphic pixel coordinate-pairs. For example, the set of display pixel coordinate-pairs can be a row of coordinate-pairs on the display 304 and the subsequent set of display pixel coordinate-pairs can be the subsequent row of coordinate-pairs on the display 304.

At 804, a subsequent transform matrix is applied to the subsequent set of display pixel coordinate-pairs to obtain subsequent set of graphic pixel coordinate-pairs. The subsequent transform matrix can be calculated using further orientation data. The further orientation data can be received from an external reference, such as the target member 104.

The further orientation data can be received or obtained more recently than the orientation data that was used to calculate the (previous) transform matrix. For example, after the initial graphic pixel data is retrieved (e.g. for rendering on the first row of the display 304), then further orientation data can be obtained to calculate a new (e.g. further or subsequent) transform matrix. In one or more embodiments, the further orientation data may indicate that the orientation or positioning of the target member 104 relative to the electronic device 106 is different than indicated by the orientation data previously obtained (e.g. as obtained for the first row). In such a situation, the subsequent transform matrix would represent a different projection of a graphic, or the subsequent transform matrix would be associated with a different three-dimensional planar region. This situation could occur, for example, if the glasses were in motion relative to the target member 104.

At 806, the subsequent set of graphic pixel data associated with the subsequent set of graphic pixel coordinate-pairs is retrieved. For example, the subsequent set of graphic pixel data may be from a graphic or a graphic element stored in memory 344.

At 808, a subsequent set of display pixel data is determined based on the retrieved subsequent set of graphic pixel data for rendering on the display 304. This may be performed using the blending module 408 as described above.

In one or more embodiments, the graphics processing unit 382 is associated with wearable glasses and the display 304 can include a first display portion, viewable by a first eye of a wearer of the glasses, and a second display portion, viewable by a second eye of the wearer of the glasses. For example, the first display portion can be a left lens and the second display portion can be the right lens. The display 304 can be viewable from both the first display portion and the second display portion thereby providing a stereoscopic view of the rendered image 108.

Figure 9:
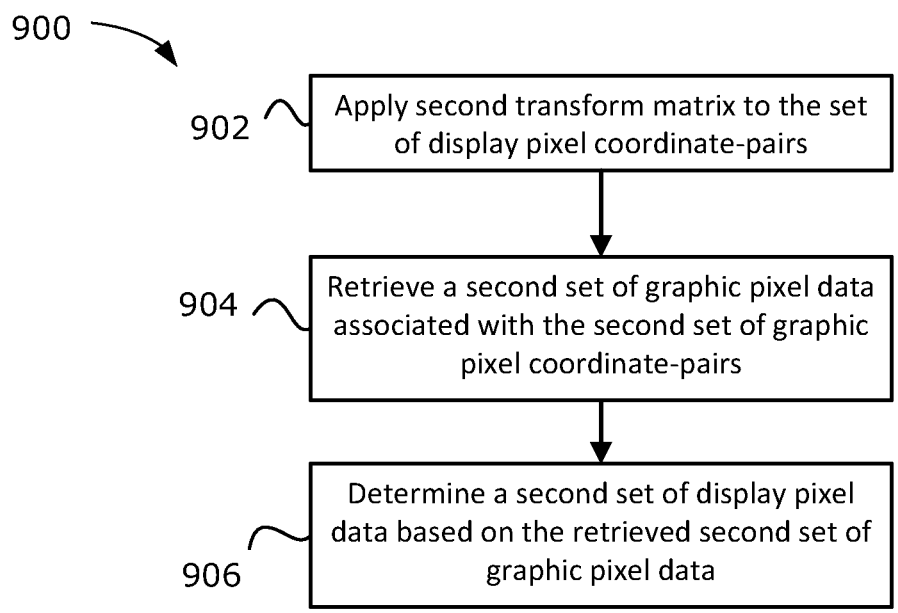
FIG. 9 is a flowchart depicting a method of generating display pixel data for rendering a representation of a graphic on a display.

FIG. 9 depicts an exemplary method 900, implemented on a graphics processing unit 382, of generating display pixel data for rendering a representation of a graphic on a display 304. A graphic generated in accordance with the method 900 depicted in FIG. 9 could be rendered as a stereoscopic image, with display pixel data being rendered on the first display portion and the second display portion of the glasses. In accordance with the illustrated method 900, the determined set of display pixel data (e.g. as determined at step 708 of method 700) is for rendering on the first display portion. By way of example, the method 900 may be performed in parallel with the method 700 illustrated in FIG. 7.

At 902, a second transform matrix is applied to the set of display pixel coordinate-pairs to obtain a second set of graphic pixel coordinate-pairs. The second transform matrix is representative of the view from the second display portion (e.g. left lens of the glasses). The second transform matrix can be calculated using orientation data received from an external reference and orientation data obtained from sensors on the electronic device 106. For example, the external reference is the target member 104 that has a plurality of LEDs 206. The second transform matrix may include a different perspective projection matrix from the transform matrix, for example.

At 904, a second set of graphic pixel data associated with the second set of graphic pixel coordinate-pairs is retrieved. For example, the second set of graphic pixel data can be retrieved from a graphic or graphic element stored in memory 344.

At 906, a second set of display pixel data is determined based on the retrieved second set of graphic pixel data. The second set of display pixel data can be calculated using the blending module 408, for example.

In one or more embodiments, the second set of display pixel data can be rendered on the second display portion of the glasses (e.g. the second lens).

In accordance with an embodiment, and with reference to the method described in FIG. 9, the warp unit 402 used to apply the second transform matrix to the set display pixel coordinate-pairs is different from the warp unit 402 used to apply the transform matrix to the set of display pixel coordinate-pairs. In order to achieve the stereoscopic effect, the second transform matrix represents a different three-dimensional planar region from the transform matrix.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware components, software or any combination of the two, or in any other manner. Moreover, an article of manufacture for use with the apparatus, such as a pre-recorded storage device or other similar computer readable storage medium including program instructions recorded thereon (which may, for example, cause a processor to perform one or more of the methods described herein), or a computer data signal carrying computer readable program instructions may direct an apparatus to facilitate the practice of the described methods. It is understood that such apparatus, articles of manufacture, and computer data signals also come within the scope of the present disclosure.

The term "computer readable storage medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile/Video Disc (DVD) or Blu-ray™ Disc, and a solid state storage device (e.g., NAND flash or synchronous dynamic RAM (SDRAM)).

The embodiments of the present disclosure described above are intended to be examples only. Those of skill in the art may effect alterations, modifications and variations to the particular embodiments without departing from the intended scope of the present disclosure. In particular, features from one or more of the above-described embodiments may be selected to create alternate embodiments comprised of a sub-combination of features which may not be explicitly described above. In addition, features from one or more of the above-described embodiments may be selected and combined to create alternate embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

What is claimed is the following:

1. A method, implemented on a graphics processing unit, of generating display pixel data for rendering a representation of a graphic on a display, the method comprising:

receiving a set of display pixel coordinate-pairs at the graphics processing unit, wherein the set of display pixel coordinate-pairs is on the same scan-line in a raster scan process on the display;

applying a transform matrix to the set of display pixel coordinate-pairs to obtain a set of graphic pixel coordinate-pairs, the transform matrix calculated using orientation data received from an external reference, wherein the transform matrix is a mapping from a two-dimensional coordinate system of the display to a three-dimensional planar region in space identified by the orientation data and a projection onto a two-dimensional plane;

retrieving a set of graphic pixel data associated with the set of graphic pixel coordinate-pairs;

determining a set of display pixel data based on the retrieved set of graphic pixel data;

rendering the set of display pixel data; and applying, using a second warp unit, a second transform matrix to a second set of display pixel coordinate-pairs to obtain a second set of graphic pixel coordinate-pairs and retrieving a second set of graphic pixel data from the image in memory, the second set of graphic pixel data associated with the second set of graphic pixel coordinate-pairs.

2. The method of claim 1, further comprising updating the transform matrix using updated orientation data from the external reference at least once per scan-line.

3. The method of claim 1, wherein one or more of the set of graphic pixel coordinate-pairs is not on the three-dimensional planar region projected on the display.

4. The method of claim 3, wherein the set of graphic pixel data associated with the one or more of the set of graphic pixel coordinate-pairs that is not on the three-dimensional planar region on the display is null.

5. The method of claim 1, wherein the set of display pixel coordinate-pairs comprise a single pixel coordinate-pair.

6. The method of claim 1, further comprising applying a pre-determined custom matrix to the set of display pixel data.

7. The method of claim 1, further comprising:

receiving a subsequent set of display pixel coordinate-pairs after retrieving the set of graphic pixel data associated with the set of graphic pixel coordinate-pairs, wherein the subsequent set of display pixel coordinate-pairs is on a next scan-line in a raster scan process on the display;

applying a subsequent transform matrix to the subsequent set of display pixel coordinate-pairs to obtain subsequent set of graphic pixel coordinate-pairs, the subsequent transform matrix calculated using further orientation data received from the external reference;

retrieving the subsequent set of graphic pixel data associated with the subsequent set of graphic pixel coordinate-pairs; and, determining a subsequent set of display pixel data based on the retrieved subsequent set of graphic pixel data for rendering on the display.

8. The method of claim 7, wherein the subsequent set of display pixel coordinate-pairs is exclusive of the set of display pixel coordinate-pairs.

9. The method of claim 7, where the subsequent transform matrix represents a subsequent three-dimensional planar region on the display corresponding to a subsequent three-dimensional plane identified by the further orientation data.

10. The method of claim 7, wherein the graphics processing unit is associated with wearable glasses, and wherein the display comprises a first display portion, viewable by a first eye of a wearer of the glasses, and a second display portion, viewable by a second eye of the wearer of the glasses.

11. The method of claim 10, wherein the determined set of display pixel data is for rendering on the first display portion, the method further comprising:

applying a second transform matrix to the set of display pixel coordinate-pairs to obtain a second set of graphic pixel coordinate-pairs, the second transform matrix calculated using the orientation data received from the external reference;

retrieving a second set of graphic pixel data associated with the second set of graphic pixel coordinate-pairs; and determining a second set of display pixel data based on the retrieved second set of graphic pixel data, the second set of display pixel data for rendering on the second display portion.

12. The method of claim 11, wherein the external reference comprises a plurality of infrared LED lights and wherein the orientation data comprises three-dimensional coordinates of the LED lights on a three-dimensional plane, and wherein the transform matrix and the second transform matrix are calculated based on the relative position of at least two of the infrared LED lights.

13. The method of claim 1, further comprising:

receiving the orientation data from the external reference, the orientation data identifying a three-dimensional plane; and, calculating the transform matrix using the orientation data, the transform matrix for orienting the set of display pixel coordinate-pairs on the three-dimensional plane and then identifying the set of graphic pixel coordinate-pairs projected onto the three-dimensional planar region that correspond to the set of display pixel coordinate-pairs on the three-dimensional plane.

14. The method of claim 1, further comprising:

applying a further transform matrix to the set of display pixel coordinate-pairs to obtain a further set of graphic pixel coordinate-pairs, the further transform matrix calculated using orientation data received from the external reference, the further transform matrix associated with a second three-dimensional planar region on the display, wherein the second three-dimensional planar region is different from the three-dimensional planar region;

retrieving a further set of graphic pixel data associated with the further set of graphic pixel coordinate-pairs; and, determining a further set of display pixel data based on the retrieved further set of graphic pixel data.

15. The method of claim 14, wherein applying the transform matrix to the set of display pixel coordinate-pairs and applying the further transform matrix to the set of display pixel coordinate-pairs is performed in parallel.

16. The method of claim 14, further comprising:

receiving further orientation data from the external reference, the further orientation data identifying a second three-dimensional plane; and, calculating the further transform matrix using the further orientation data, the second transform matrix associated with the second three-dimensional planar region on the display corresponding to the second three-dimensional plane.

17. The method of claim 16 wherein the further orientation data is the same as the orientation data and wherein the second three-dimensional plane is different from the three-dimensional plane.

18. The method of claim 1 wherein the set of graphic pixel data is retrieved from a graphic stored in memory associated with the graphics processing unit.

19. A graphics processing unit associated with a memory, the graphics processing unit comprising:
  a controller configured to calculate a transform matrix based on orientation data received from an external reference, the orientation data representing a three-dimensional plane;
  a warp unit in communication with the controller configured to apply the transform matrix to a set of display pixel coordinate-pairs to calculate a set of graphic pixel coordinate-pairs, wherein the set of display pixel coordinate-pairs is on the same scan-line in a raster scan process on the display, and wherein the transform matrix is a mapping from a two-dimensional coordinate system of the display to a three-dimensional planar region in space identified by the orientation data and a projection onto a two-dimensional plane;
  a pixel-fetch module in communication with the warp unit configured to retrieve a set of graphic pixel data from a graphic stored in memory, the set of graphic pixel data associated with the set of graphic pixel coordinate-pairs;
  a blending module in communication with the pixel-fetch module configured to determine the set of display pixel data associated with the set of display pixel coordinate-pairs, the display pixel data calculated based on the retrieved set of graphic pixel data;
  a rendering module in communication with the blending module configured to render the set of display pixel data on the display; and
  a second warp unit in communication with the controller and configured to apply a second transform matrix to a second set of display pixel coordinate-pairs to obtain a second set of graphic pixel coordinate-pairs and wherein the pixel-fetch module is configured to retrieve a second set of graphic pixel data from the image in memory, the second set of graphic pixel data associated with the second set of graphic pixel coordinate-pairs.

20. The graphics processing unit of claim 19, further comprising an orientation module configured to:
  receive the orientation data from the external reference, the orientation data identifying a three-dimensional plane; and,
  calculate the transform matrix using the orientation data, the transform matrix for identifying the set of graphic pixel coordinate-pairs projected onto the three-dimensional planar region visible at the set of display pixel coordinate-pairs.

21. The graphics processing unit of claim 19, wherein the second warp unit is configured to apply the second transform matrix to the second set of display pixel coordinate-pairs and the warp unit is configured to apply the transform matrix to the set of display pixel coordinate-pairs in parallel.

22. The graphics processing unit of claim 21, wherein the display comprises wearable glasses having a first display portion, viewable by a first eye of a wearer of the glasses, and a second display portion, viewable by a second eye of the wearer of the glasses, wherein the rendering module is configured to render the set of display pixel data on the first display portion and to render the second set of display pixel data to the second display portion, thereby rendering a stereoscopic image on the display.

23. The graphics processing unit of claim 21, wherein the controller is configured to calculate the second transform matrix based on the orientation data received from the external reference, the second transform matrix associated with a second three-dimensional planar region on the display corresponding to the second three-dimensional plane.

24. A system for generating and displaying an image, the system comprising:
  a memory;
  a processor for executing instructions stored on the memory;
  a display; and,
  a graphics processing unit connected to the memory, display and processor, the graphics processing unit comprising:
    a control processor configured to calculate a transform matrix based on orientation data received from an external reference identifying a three-dimensional plane;
    a warp unit in communication with the control processor configured to apply the transform matrix to a set of display pixel coordinate-pairs to obtain a set of graphic pixel coordinate-pairs, wherein the set of display pixel coordinate-pairs is on the same scan-line in a raster scan process on the display, and wherein the transform matrix is a mapping from a two-dimensional coordinate system of the display to a three-dimensional planar region in space identified by the orientation data and a projection onto a two-dimensional plane;
    a pixel-fetch module in communication with the warp unit configured to retrieve a set of graphic pixel data from an image stored in memory, the set of graphic pixel data associated with the set of graphic pixel coordinate-pairs;
    a blending module in communication with the pixel-fetch module configured to determine the set of display pixel data associated with the set of display pixel coordinate-pairs for a rendering on the display; and
    a second warp unit in communication with the controller for applying a second transform matrix to a second set of display pixel coordinate-pairs to obtain a second set of graphic pixel coordinate-pairs and wherein the pixel-fetch module is configured to retrieve a second set of graphic pixel data from the image in memory, the second set of graphic pixel data associated with the second set of graphic pixel coordinate-pairs.

25. The system of claim 24, wherein the display comprises wearable glasses.

26. The system of claim 24, further comprising a sensor configured to receive the orientation data from the external reference, the sensor coupled to the control processor.

* * * * *